(12) United States Patent
Sundararaman et al.

(10) Patent No.: US 10,774,876 B1
(45) Date of Patent: Sep. 15, 2020

(54) HYDRODYNAMIC THRUST WASHERS WITH PUMPING FEATURES FOR SPARSE LUBRICATION APPLICATIONS

(71) Applicant: Freudenberg-NOK General Partnership, Plymouth, MI (US)

(72) Inventors: Saikrishna Sundararaman, Canton, MI (US); Raymond L. Szparagowski, Bowling Green, OH (US); Raymond P. Hartzell, Arlington, OH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 16/394,396

(22) Filed: Apr. 25, 2019

(51) Int. Cl.
*F16C 33/10* (2006.01)
*F16C 17/04* (2006.01)
*F01D 25/16* (2006.01)

(52) U.S. Cl.
CPC ........ *F16C 33/1075* (2013.01); *F01D 25/168* (2013.01); *F16C 17/047* (2013.01); *F16C 2300/02* (2013.01)

(58) Field of Classification Search
CPC .. F16C 17/045; F16C 17/047; F16C 33/1045; F16C 33/106; F16C 33/1075; F16C 2360/02; F01D 25/168
USPC ....... 384/121, 123, 286, 368, 420, 283, 291, 384/305
See application file for complete search history.

(56) References Cited

U.S. PATENT DOCUMENTS

| | | | |
|---|---|---|---|
| 2,362,667 A * | 11/1944 | Schmidt | F04D 5/001 384/305 |
| 2,615,766 A | 10/1952 | Wallace | |
| 2,872,256 A | 2/1959 | Thomson | |
| 3,370,897 A | 2/1968 | Rylatt | |

(Continued)

FOREIGN PATENT DOCUMENTS

| | | | |
|---|---|---|---|
| EP | 0402333 A2 | 12/1990 | |
| GB | 711075 A * | 6/1954 | ............. F16C 17/04 |

(Continued)

OTHER PUBLICATIONS

"Development of Low Friction Washer for AT-CVT (Torque Converter)"; Seki et al, NOK Corporation, SAE International © 2007; Publication No. 2007-01-0573 (5 pages).

(Continued)

*Primary Examiner* — Marcus Charles
(74) *Attorney, Agent, or Firm* — Daniel J. Sepanik, Esq.; Harness, Dickey & Pierce, P.L.C.

(57) ABSTRACT

A thrust washer includes an annular body with an aperture therein and having a first axial face and a second axial face, an outer diameter edge and an inner diameter edge extending between the first and second axial faces. At least one of the first and second axial faces includes a plurality of recessed grooves extending at least partially between the inner edge and the outer edge and defining un-recessed lands between the recessed grooves. The plurality of recessed grooves include a transition region transitioning to the lands and a scoop region separated from the transition region by a stepped wall portion extending between the scoop region and the tapered region. The recessed grooves can include directional symmetric bi-directional grooves for use in systems with rotation in both directions.

19 Claims, 15 Drawing Sheets

(56) References Cited

U.S. PATENT DOCUMENTS

| | | | | |
|---|---|---|---|---|
| 3,399,007 | A * | 8/1968 | Remmers | F16C 17/08 384/371 |
| 3,484,143 | A | 12/1969 | Sibley | |
| 3,495,886 | A * | 2/1970 | Roberts | F16C 17/065 384/420 |
| 3,891,282 | A | 6/1975 | Tuffias et al. | |
| 4,380,355 | A | 4/1983 | Beardmore et al. | |
| 4,383,771 | A * | 5/1983 | Freytag | F16C 33/106 384/121 |
| 4,728,201 | A | 3/1988 | Abbe et al. | |
| 5,143,384 | A * | 9/1992 | Lipschitz | F16J 15/3412 277/400 |
| 5,407,281 | A * | 4/1995 | Chen | F16C 17/02 384/107 |
| 5,554,015 | A | 9/1996 | Dreiman et al. | |
| 5,602,945 | A | 2/1997 | Davis et al. | |
| 5,676,230 | A | 10/1997 | Awaji et al. | |
| 5,829,338 | A | 11/1998 | Chrestoff et al. | |
| 6,024,495 | A | 2/2000 | Loos et al. | |
| 6,827,494 | B2 * | 12/2004 | Aguilar | F16C 33/106 384/121 |
| 6,935,849 | B2 | 8/2005 | Gutknecht et al. | |
| 6,976,788 | B2 | 12/2005 | Honda et al. | |
| 7,401,980 | B2 * | 7/2008 | Krauss | F01D 25/168 384/112 |
| 7,435,003 | B2 | 10/2008 | Nakamura et al. | |
| 8,021,105 | B2 * | 9/2011 | Ammann | F01D 25/168 384/123 |
| 8,105,170 | B2 | 1/2012 | Mizuno et al. | |
| 8,231,277 | B2 | 7/2012 | Morales Espejel et al. | |
| 9,016,947 | B2 * | 4/2015 | Flores | F16C 39/02 384/100 |
| 9,447,819 | B2 | 9/2016 | Dehne et al. | |
| 9,574,606 | B2 * | 2/2017 | Benco | F16C 33/1065 |
| 9,810,259 | B2 * | 11/2017 | Furuno | F16C 17/047 |
| 9,938,982 | B1 * | 4/2018 | Bischof | F04D 29/051 |
| 10,060,470 | B2 * | 8/2018 | Futae | F01D 25/168 |
| 2001/0005436 | A1 | 6/2001 | Sjostrom et al. | |
| 2003/0117906 | A1 | 6/2003 | Rahman | |
| 2006/0165325 | A1 | 7/2006 | Link et al. | |
| 2013/0164128 | A1 | 6/2013 | Nguyen-Schaefer et al. | |
| 2015/0204377 | A1 | 7/2015 | Barbosa De Oliveira Ferreira Salles et al. | |
| 2018/0058499 | A1 * | 3/2018 | Sundararaman | F16C 17/105 |

FOREIGN PATENT DOCUMENTS

| | | | | |
|---|---|---|---|---|
| JP | S57-161318 A | | 10/1982 | |
| JP | 06288411 A | | 10/1994 | |
| JP | 11170397 A | | 6/1999 | |
| JP | 2002-081446 A | | 3/2002 | |
| JP | 2004293684 A | | 10/2004 | |
| JP | 2006207718 A | * | 8/2006 | F16C 17/04 |
| JP | 2007218326 A | * | 8/2007 | F16C 33/46 |
| JP | 2008261474 A | | 10/2008 | |
| JP | 2015-075225 A | | 4/2015 | |
| JP | 2015-158212 A | | 9/2015 | |
| WO | 2016/063340 A1 | | 4/2016 | |
| WO | WO-2019015753 A1 | * | 1/2019 | F16C 17/047 |

OTHER PUBLICATIONS

European Search Report dated Jan. 19, 2018 (corresponding to EP17186172.7).

* cited by examiner

HYDRODYNAMIC THRUST WASHERS WITH PUMPING FEATURES FOR SPARSE LUBRICATION APPLICATIONS

FIELD

The present disclosure relates to hydrodynamic thrust washers with pumping features for sparse lubrication applications.

BACKGROUND

This section provides background information related to the present disclosure which is not necessarily prior art.

Thrust washers fail due to loss of lubrication and high interface temperature conditions. One of the common failure modes for polymeric thrust bearings is due to excessive interface temperature resulting directly due to loss of lubrication. This mode of failure is prominent in applications where lubrication is available only at the OD of the bearing due to the inability of existing designs to effectively pump lubricant into the interface by overcoming centrifugal force. As a result, use of polymeric bearings in such application conditions has been a challenge.

SUMMARY

This section provides a general summary of the disclosure, and is not a comprehensive disclosure of its full scope or all of its features.

The present disclosure is directed to a thrust bearing made from a thermoplastic, thermoset, metallic, or ceramic material. The present disclosure uses improved groove features to improve the ability to form thin lubricant films. The features allow better film generation and thereby lower friction and interface temperature. These features allow for use of very low lubrication conditions as they more effectively use the lubricant than conventional groove geometries. The result of these new designs allows them to be used in more aggressive speed and pressure applications while also reducing the torque compared to designs used today.

The new groove features pump lubricant from the OD of the washer to the ID while providing hydrodynamic performance. The features provide optimal volume of lubricant flow over a range of speeds to keep frictional drag to a minimum and allow for use of very low lubrication conditions as they more effectively use the lubricant than conventional groove geometries.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
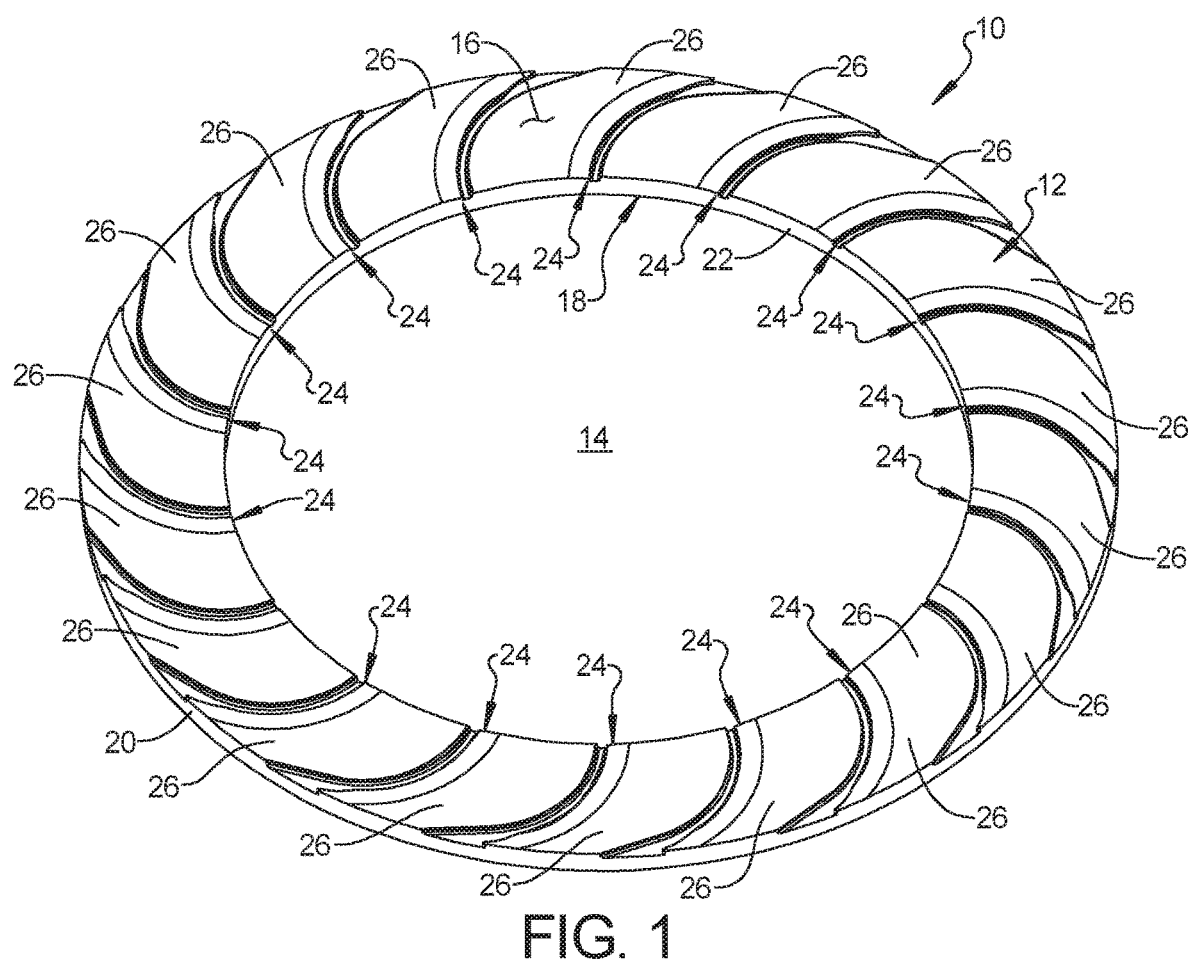
FIG. 1 is a perspective view of a thrust washer having hydrodynamic features according to a first embodiment.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
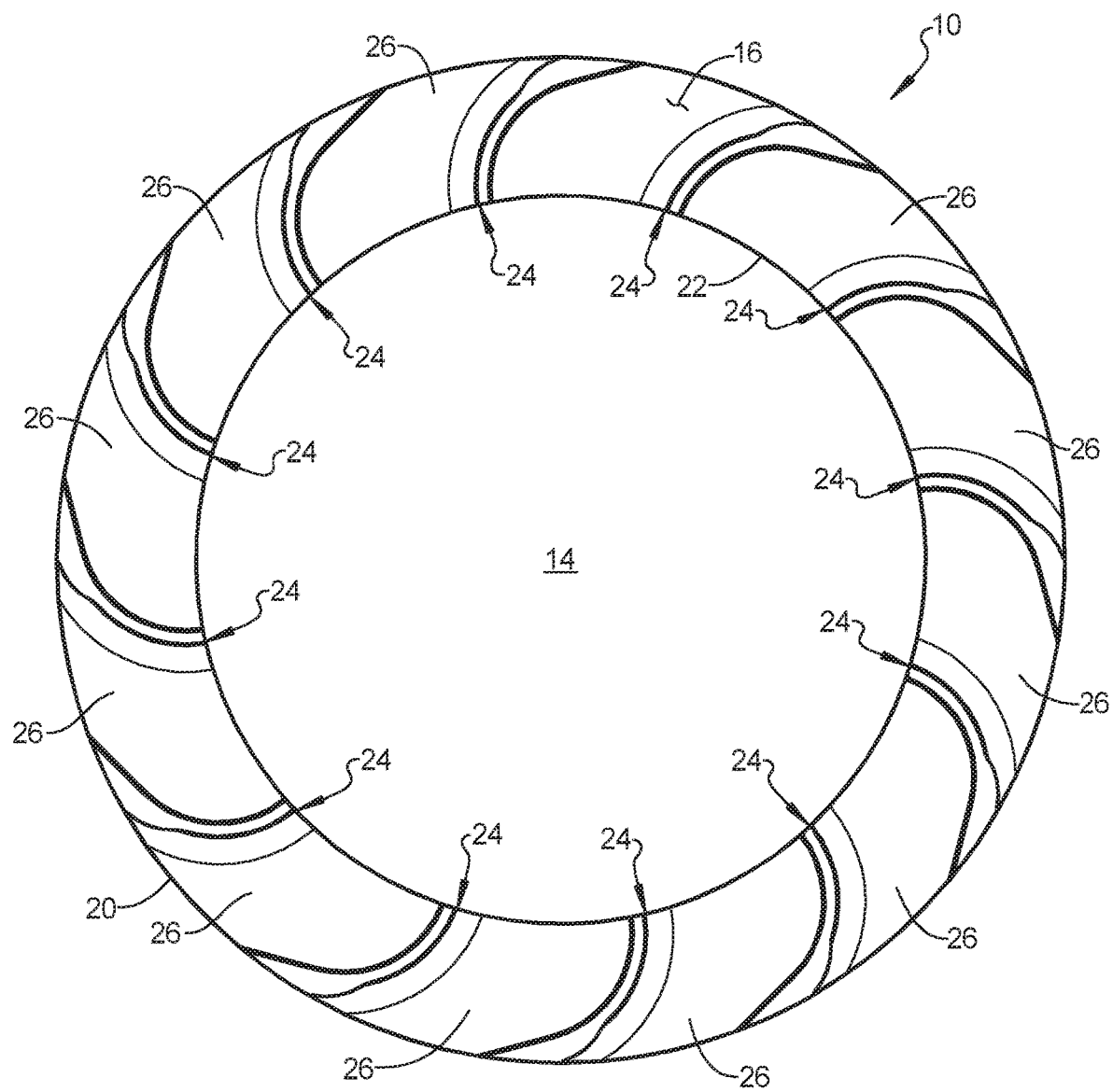
FIG. 2 is a plan view of a thrust washer similar to the thrust washer shown in FIG. 1, with a smaller number of hydrodynamic groove features.
Figure 3:
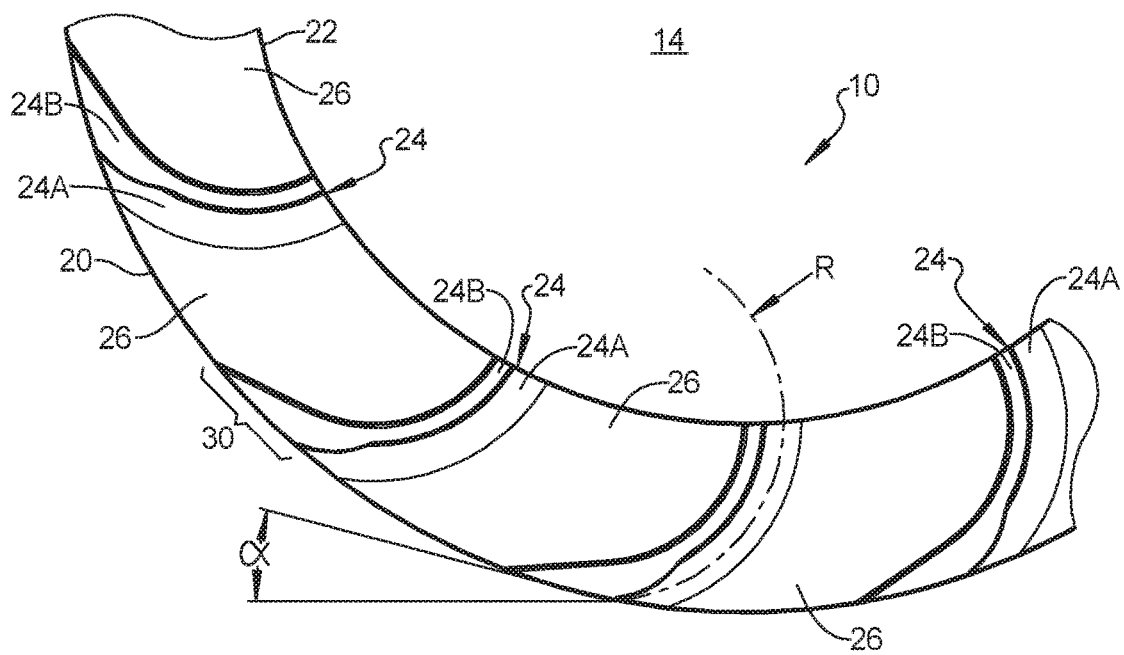
FIG. 3 is a detail plan view of the hydrodynamic features of the thrust washer shown in FIGS. 1 and 2.
Figure 6:
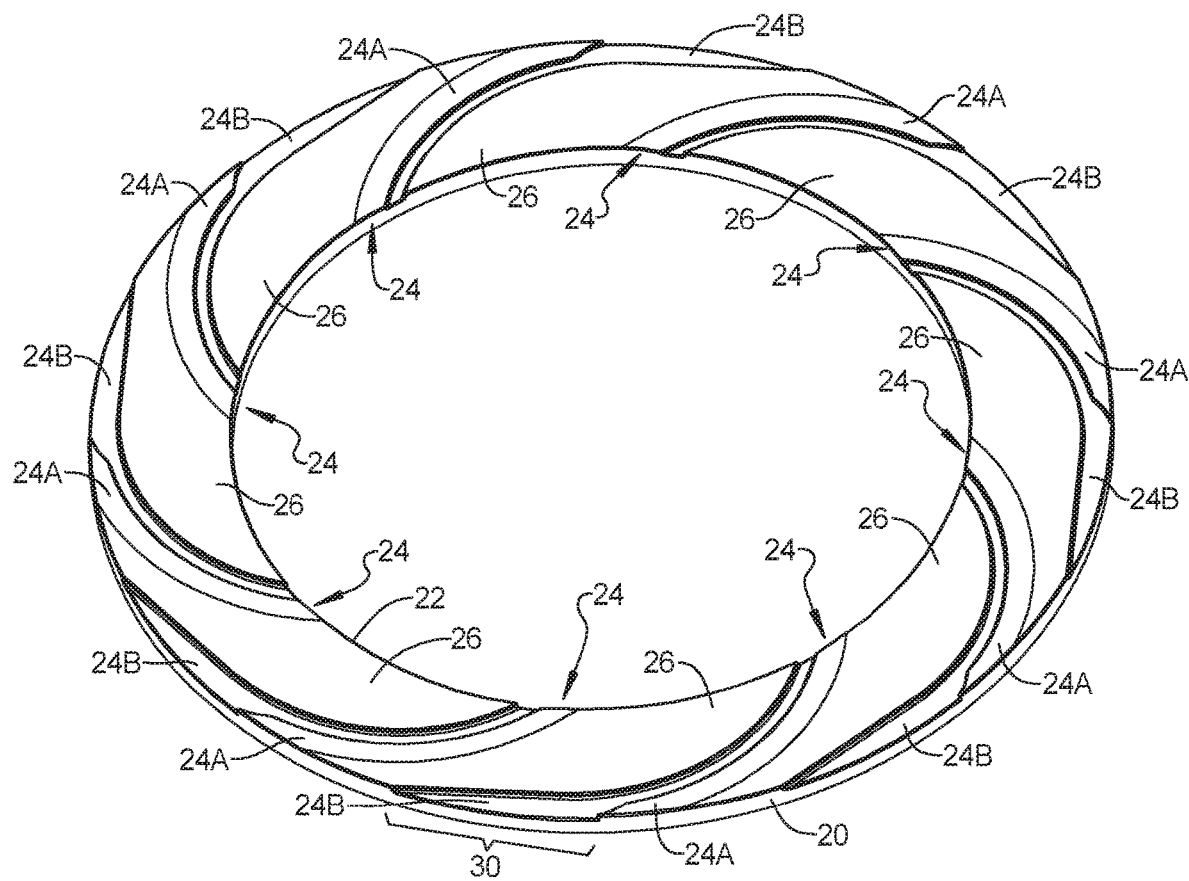
FIG. 6 is a perspective view of a thrust washer having hydrodynamic features according to a fourth embodiment.

With reference to FIG. 1, a thrust bearing 10 is shown including an annular body 12 with an aperture 14 therein. The annular body 12 has a first axial face 16 and a second axial face 18 along with an outer diameter sidewall 20 and in inner diameter sidewall 22 extending between the first and second axial faces 16, 18. At least one of the axial faces 16, 18 includes a plurality of recessed hydrodynamic groove features 24 extending from the inner diameter sidewall 22 to the outer diameter sidewall 20, as shown in the axial face 16. The axial face 16 includes a plurality of planar lands 26 disposed between the recessed hydrodynamic groove features 24. The hydrodynamic groove features 24 of FIGS. 2 and 3 are the same as the hydrodynamic groove features 24 in FIG. 1, with the exception that FIG. 1 shows 18 hydrodynamic groove features 24 and FIGS. 2 and 3 show 12 hydrodynamic groove features 24. It should be understood that the number of hydrodynamic groove features 24 can be selected based upon a specific application. By way of Example, FIG. 6 shows eight hydrodynamic groove features 24.

The thrust bearing according to the present disclosure is made from a thermoplastic, thermoset, or other engineering materials including metals and ceramics manufactured using machining, molding, sintering, stamping, or other techniques. The proposed designs of FIGS. 1-16 and 21-22 are specific to applications where lubrication is available at the outer diameter (OD) of the bearing as opposed to the inner diameter (ID). The lubrication availability could be either pressurized lubrication at the OD (higher pressure at the OD than at ID) or splash type lubrication with sparse availability of the lubricant at the OD.

Figure 7:
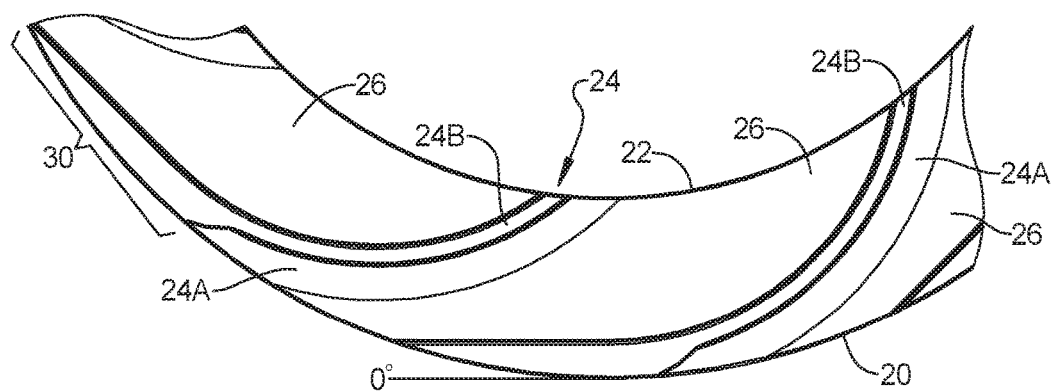
FIG. 7 is a detail plan view of the hydrodynamic features of the thrust washer shown in FIG. 6.
Figure 8:
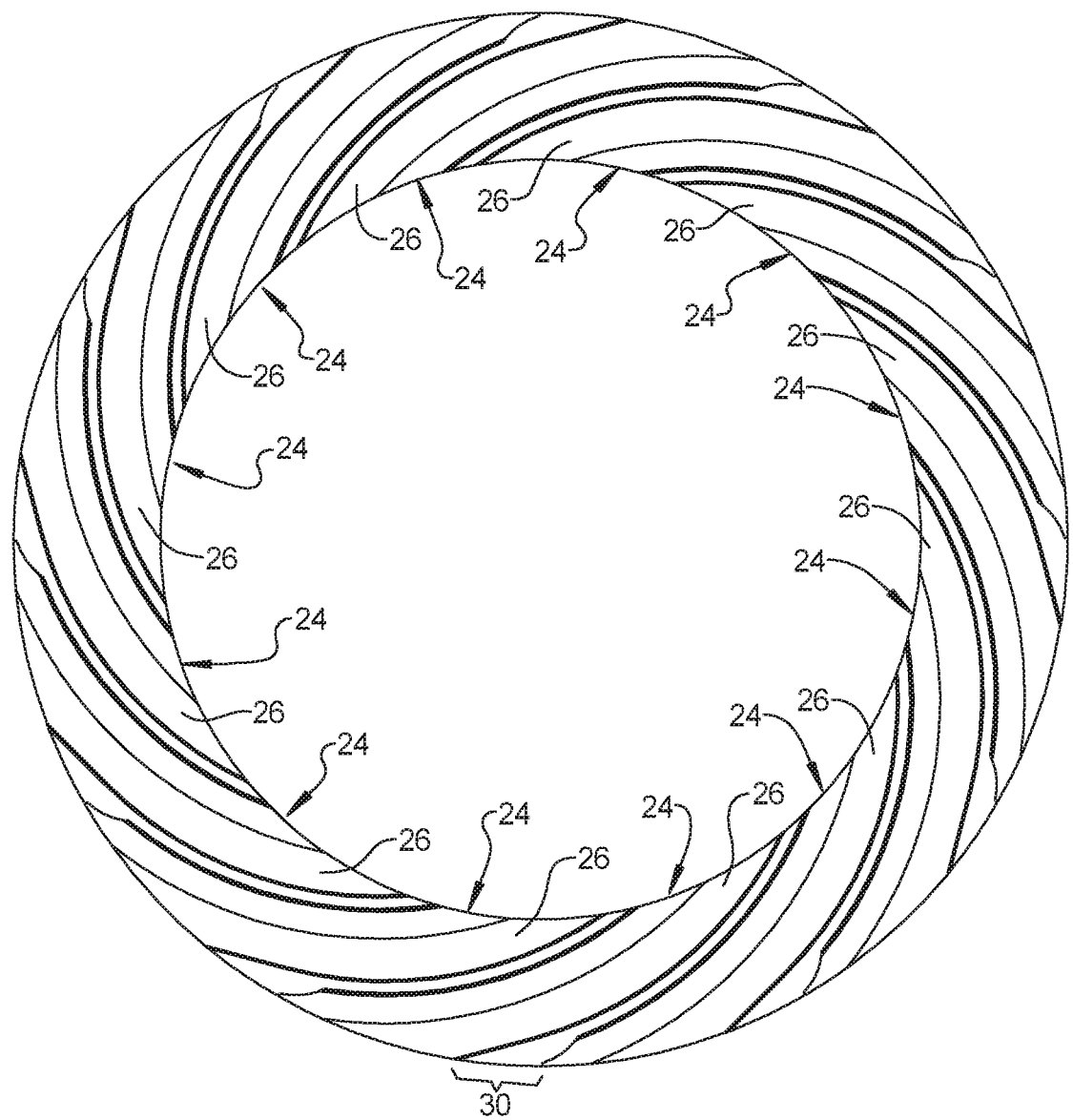
FIG. 8 is a perspective view of a thrust washer having hydrodynamic features according to a fifth embodiment.

The recessed hydrodynamic groove features 24 can consist of a spiral shaped groove that can have a radial profile R1. As shown in FIGS. 1-3, the radial profile R can be less than one-half the inside diameter, as illustrated in FIGS. 2 and 3. As an alternative, as shown in FIGS. 6 and 7, the radial profile R2 can be equal to the one-quarter of the OD. As a further alternative, as shown in FIG. 8, the radial profile R3 can be greater than one-quarter of the OD. It should be understood that the radial profile R can be selected based upon the desired application and can have a radius value ranging from 0.005 inches to 0.95*ID. In addition, the radial profile can be tangent to the inlet angle and can be circular, elliptical, hyperbolic, or logarithmic.

Figure 4:
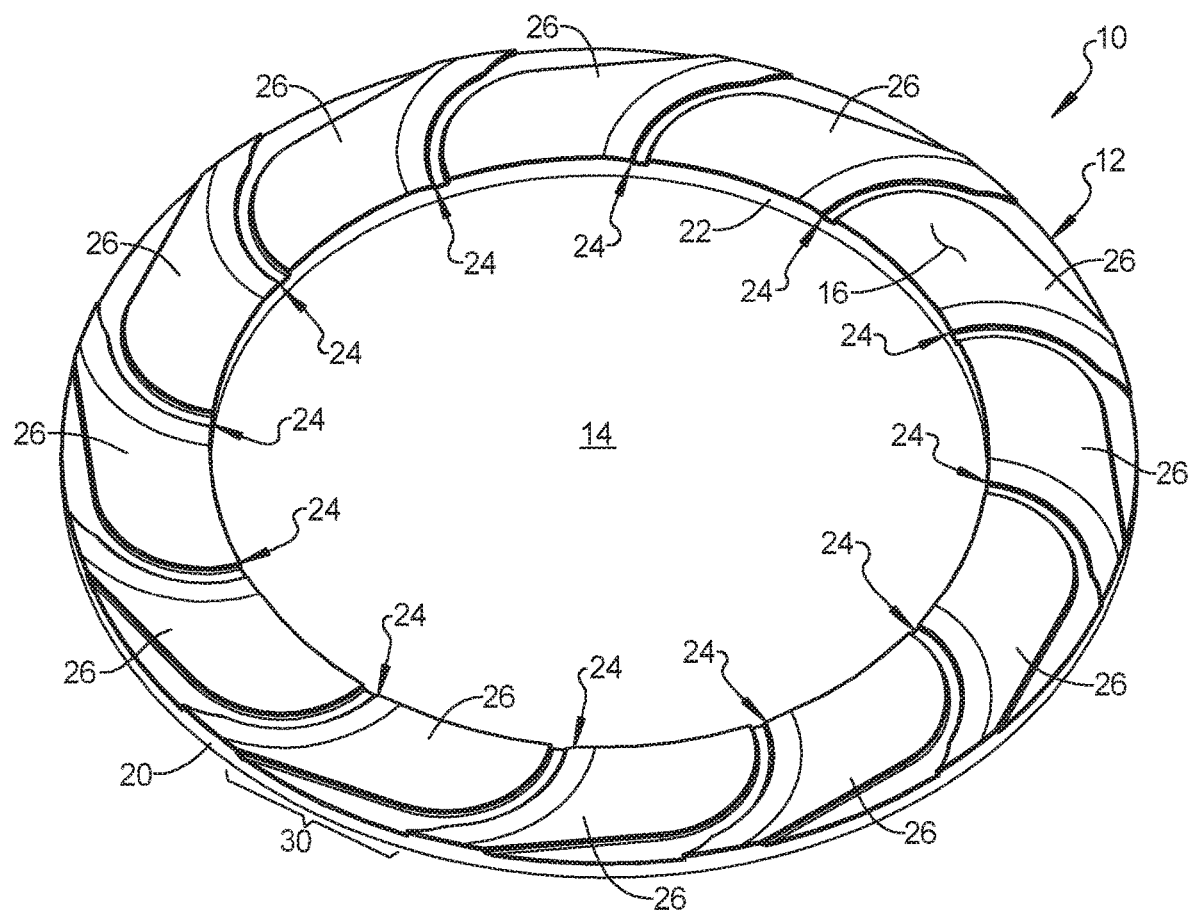
FIG. 4 is a perspective view of a thrust washer having hydrodynamic features according to a second embodiment.
Figure 5:
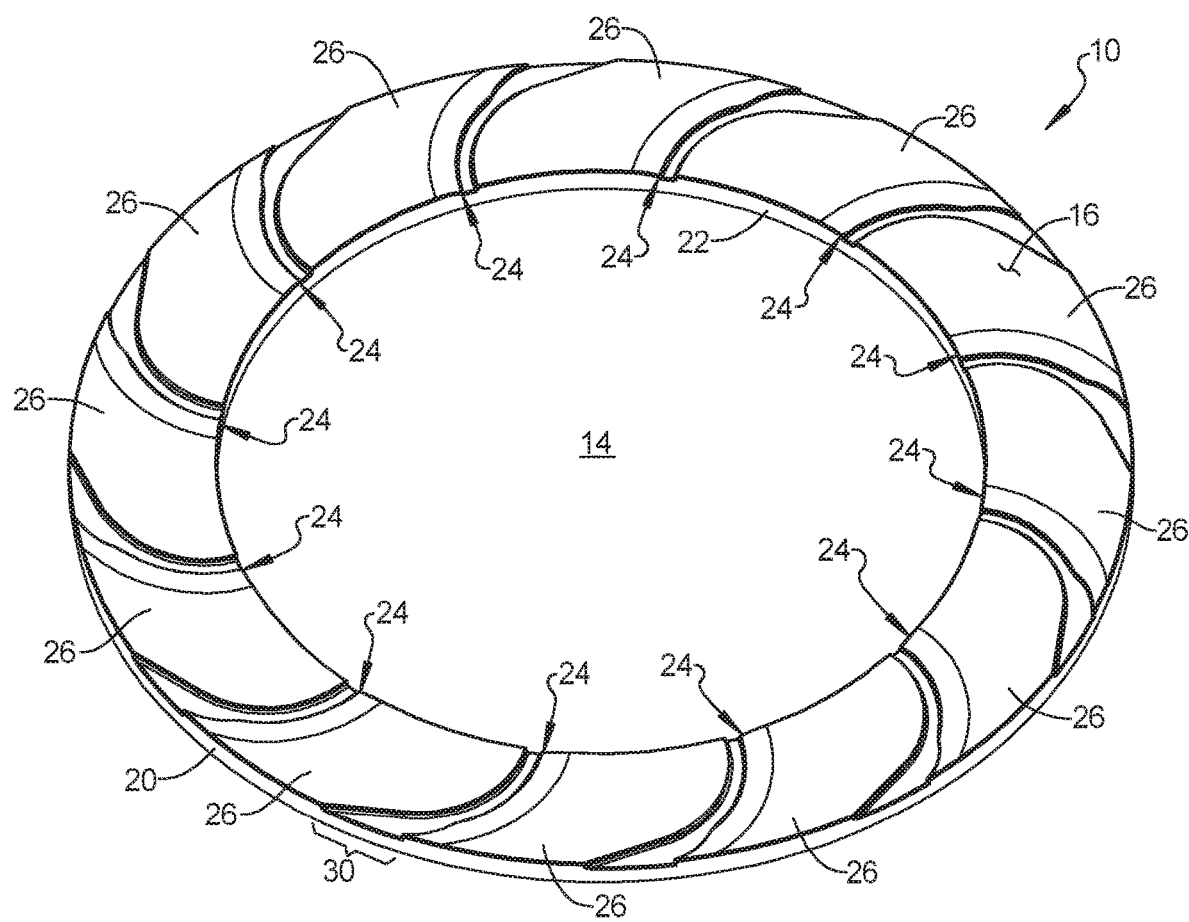
FIG. 5 is a perspective view of a thrust washer having hydrodynamic features according to a third embodiment.

The recessed hydrodynamic groove features 24 include a first transition groove region 24A that transitions from the planar lands 26 and a scoop region 24B stepped down relative to the transition groove region 24A and the planar lands 26. The transition groove region 24A of the recessed hydrodynamic groove features 24 include an inlet angle $\alpha$ defined by an angle of a tangent of the radial profile R relative to a tangent of the circular outer sidewall 20. The inlet angle can range from 0 to 85°. As shown in FIG. 3, the angle $\alpha$ is shown as 15°. Alternatively, as shown in FIG. 7, the angle $\alpha$ is shown as 0°. It should be understood that the inlet angle $\alpha$ can be selected based upon the desired application. In addition, the scoop region 24B can be designed with a specified depth D (best illustrated in FIGS. 13 and 15), tip radius $R_t$, lead-in radius $R_{Li}$ and blend radius $R_b$ as best illustrated by the detailed view of FIG. 11. The scoop tip radius $R_t$ ranges from 0.001 to 0.1 inches. The scoop lead-in radius $R_{Li}$ can range from 0.005 to 0.75 inches. The scoop blend radius $R_b$ can range from 0.005 to 1.0 inches. As shown in FIGS. 4 and 5, the entry end 30 of the scoop regions 24B can be designed to be circumferentially longer or shorter depending upon the desired application.

The scoop regions 24B are designed to pump lubricant available at the OD of the washer to the ID by overcoming centrifugal force (which acts to push the fluid outwards) for a range of rotational speeds. The transition groove regions 24A of the hydrodynamic grooves 24 aid in promoting fluid flow into the lands 26 of the washer 10 by generating and retaining a fluid film to support thrust forces over a range of loads, speeds and lubrication conditions, thus minimizing frictional losses and wear of the land surfaces 26. The ability to draw fluid from the OD to the ID of the washer 10 enables the washer 10 to operate in OD splash and pressurized lubricated environments.

The groove features have been designed using analytic tools and have also been validated on test stands. Results from tests are summarized in FIGS. 17 through 20, which show critical speeds and pump rates for the designs in FIGS. 1, 4-6, 9, and 16. The critical speed is defined as the speed corresponding to when the pump rate goes to zero. Results are also compared to traditional prior art designs PA1, PA2. As can be seen, the developed designs have significantly improved critical speeds and pump rates compared to the baseline designs PA1 and PA2.

Figure 9:
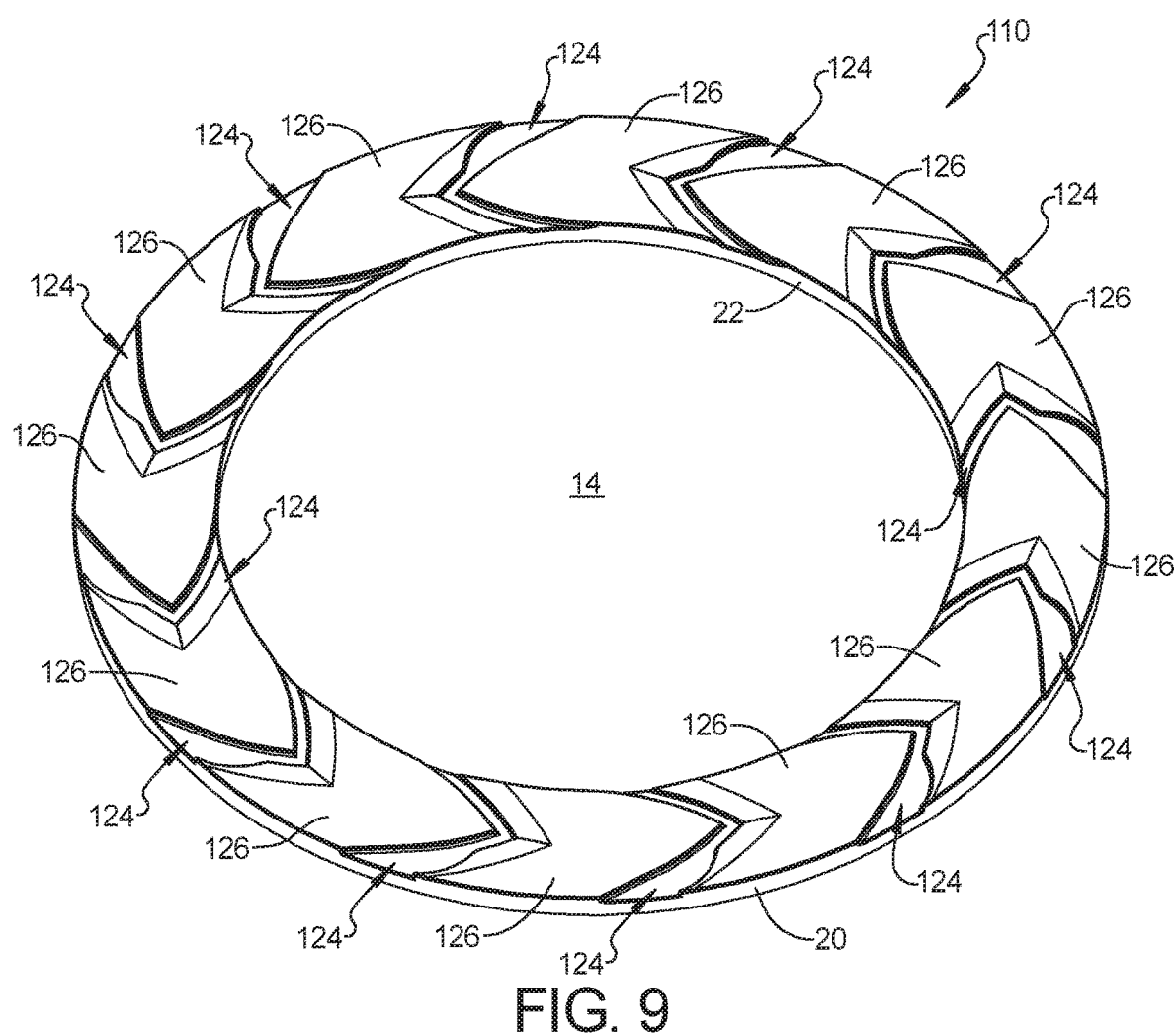
FIG. 9 is a perspective view of a thrust washer having hydrodynamic features according to a sixth embodiment.
Figure 10:
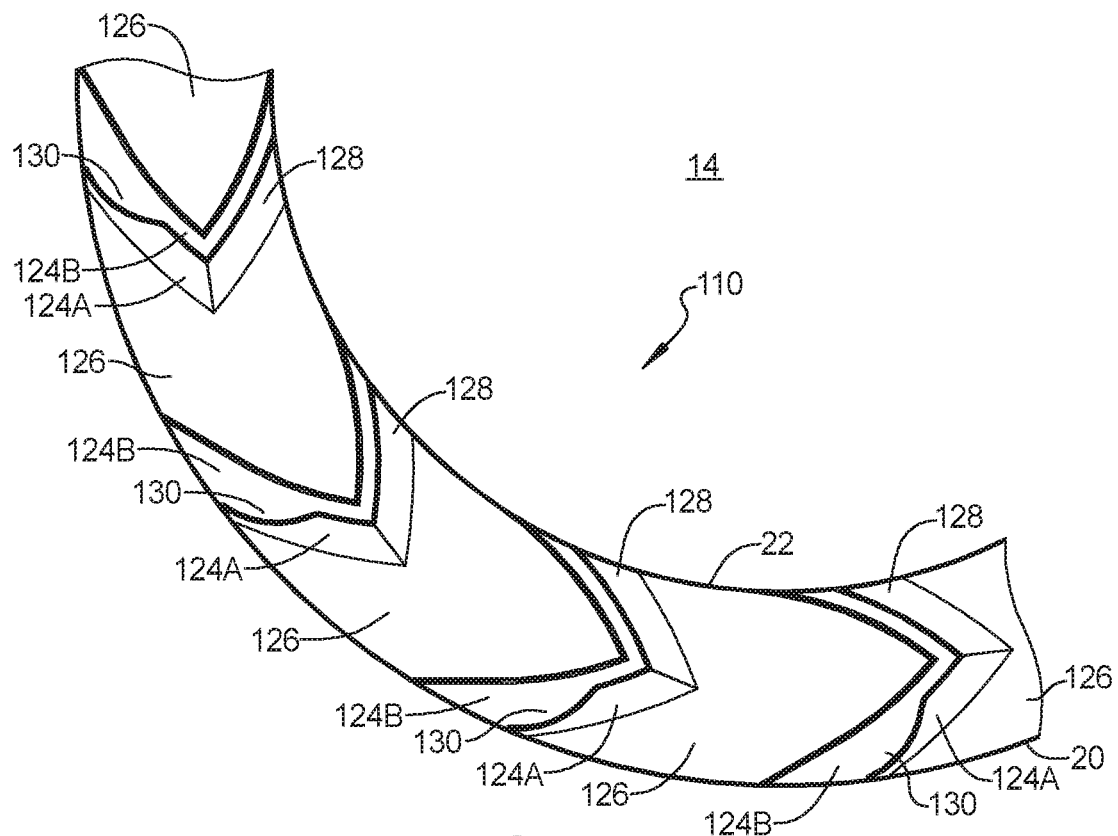
FIG. 10 is a partial plan view of the thrust washer shown in FIG. 9.
Figure 11:
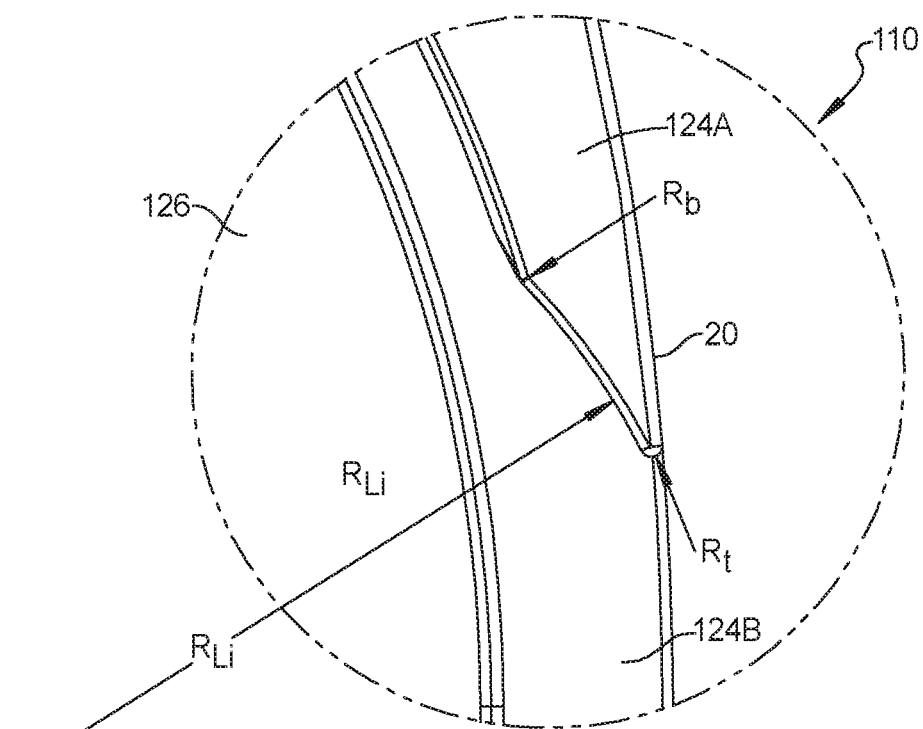
FIG. 11 is a detail plan view of the hydrodynamic features of the thrust washer shown in FIG. 8.

The thrust washer 110 of FIGS. 9-11 includes chevron-shaped grooves 124. The chevron-shaped grooves 124 of FIG. 9 include an inner segment 128 and an outer segment 130 forming a V that points in a circumferential direction of the washer 10. The chevron-shaped grooves 124 replace the spiral shaped grooves 24 and include a transition groove region 124A and a scoop region 124B. The chevron-shaped groove 124 achieves unique results, in that, it has increased critical speed despite low pump rate as this design primarily promotes fluid film generation by pumping fluid both from the ID and the OD of the bearing. The chevron type groove 124 can be utilized to lubricate the interface using fluid available both at the ID and the OD. The chevron-shaped groove features can be provided with an offset between the grooves on the OD and the ID.

Based on application conditions, the parameters for the thrust washer design can be tailored to meet specific operation requirements. These new designs are ideal for use in OD splash lubricated and OD pressurized applications.

Figure 12:
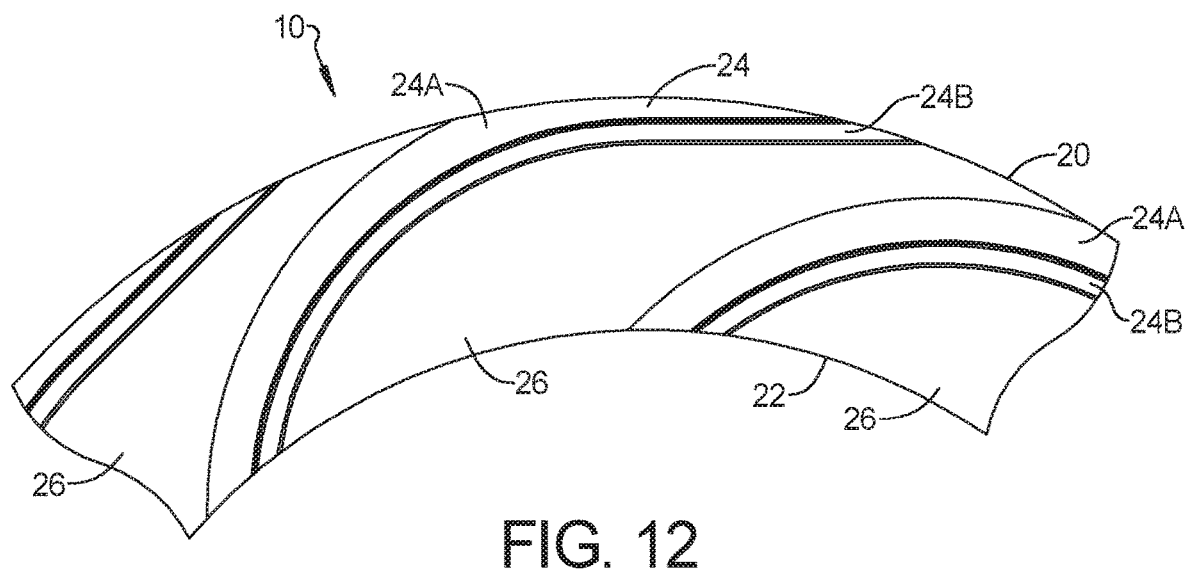
FIG. 12 is a detail plan view of the hydrodynamic features according to a seventh embodiment of a thrust washer.
Figure 13:
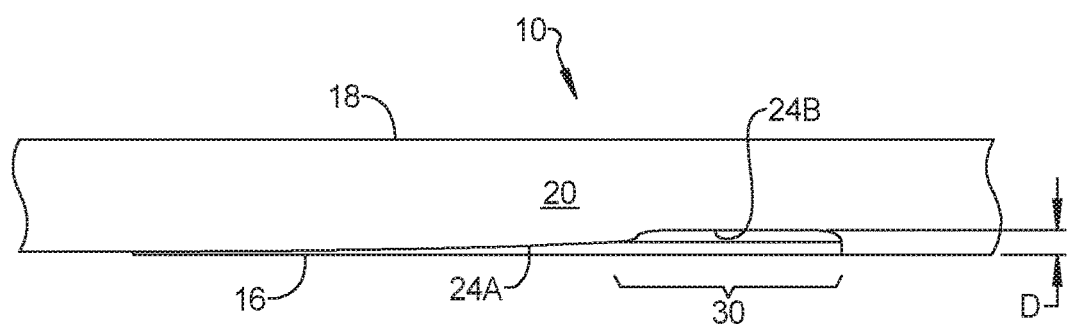
FIG. 13 is a side plan view of the hydrodynamic features of the thrust washer shown in FIG. 12.

FIG. 12 shows a detailed plan view of an exemplary recessed hydrodynamic groove feature 24 according to a seventh embodiment. FIG. 13 is a side plan view of the washer 10 showing the entry end 30 of the scoop region 24B and the transition groove region 24A. In the embodiment of FIGS. 12 and 13, the entry end 30 of the scoop region 24B has an entry length L1 that is circumferentially shorter than the entry length L2 of the entry end of the transition groove region 24A. The scoop region 24B has a depth D and the step region 32 between the scoop region 24B and the transition groove region 24A can be arcuate or angled and can have a height H extending upward from the scoop region 24B.

Figure 14:
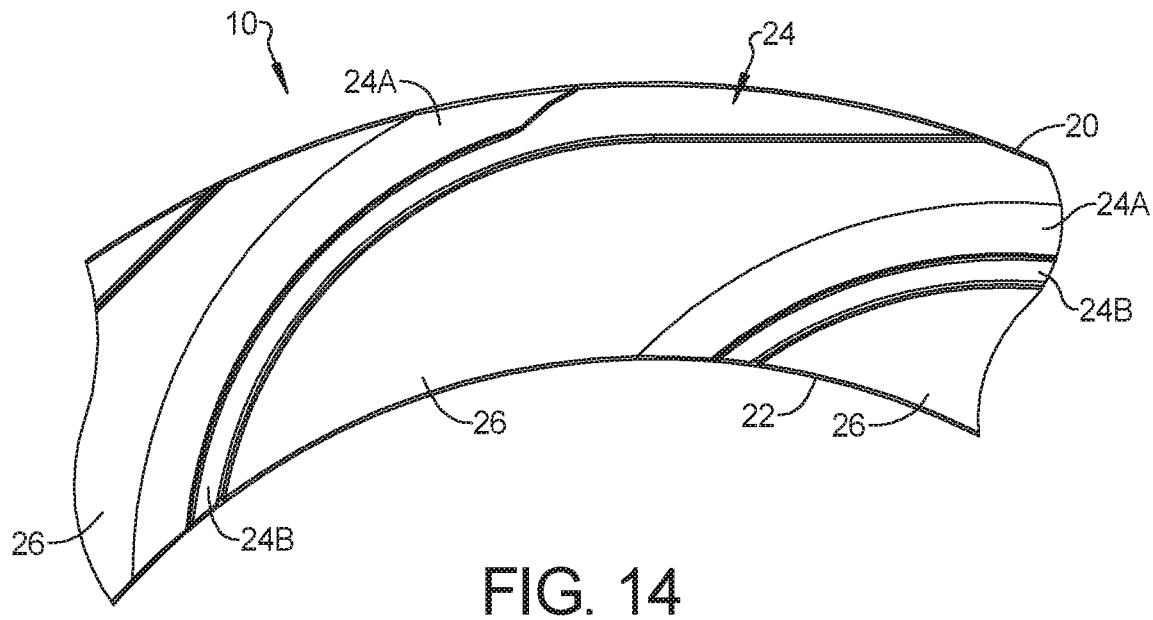
FIG. 14 is a detail plan view of the hydrodynamic features shown in FIG. 4.
Figure 15:
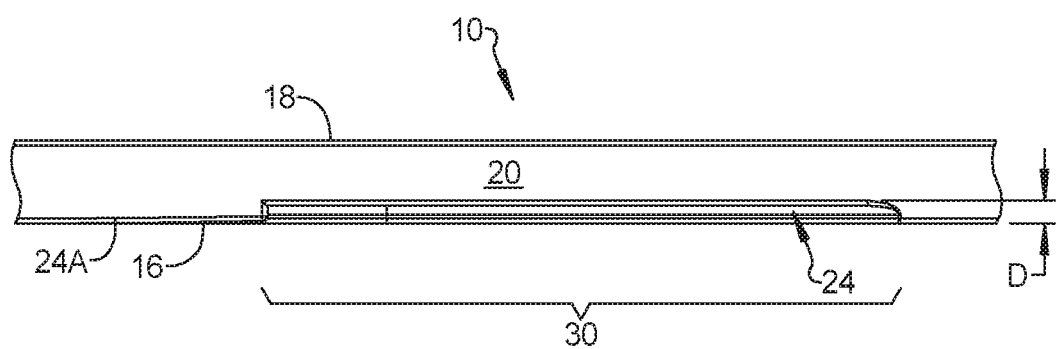
FIG. 15 is a side plan view of the hydrodynamic features of the thrust washer shown in FIG. 14.

FIG. 14 shows a detailed plan view of an exemplary recessed hydrodynamic groove feature 24 according to a fourth embodiment. FIG. 15 is a side plan view of the washer 10 showing the entry end 30 of the scoop region 24B and the transition groove region 24A. In the embodiment of FIGS. 14 and 15, the entry end 30 of the scoop region 24B is circumferentially longer than the entry end of the transition groove region 24A.

Figure 16:
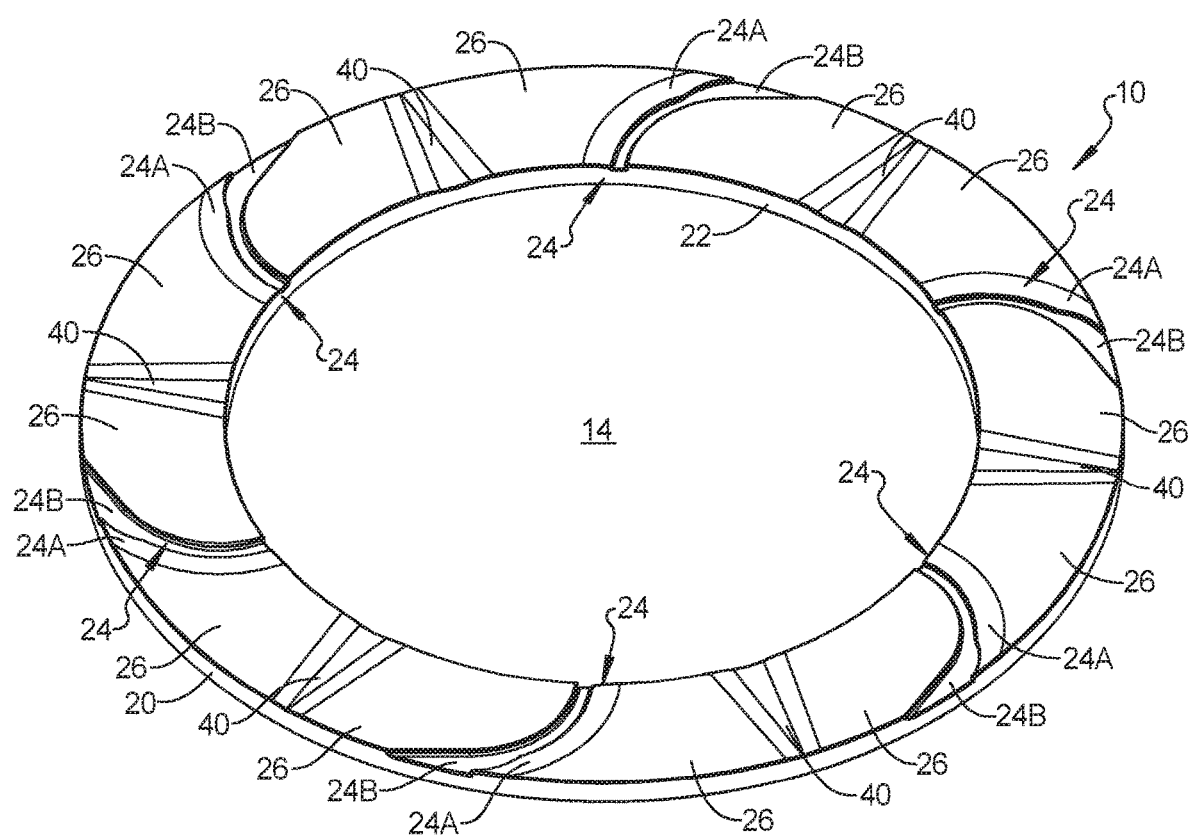
FIG. 16 is a perspective view of a thrust washer having hydrodynamic features according to an eighth embodiment.
Figure 17:
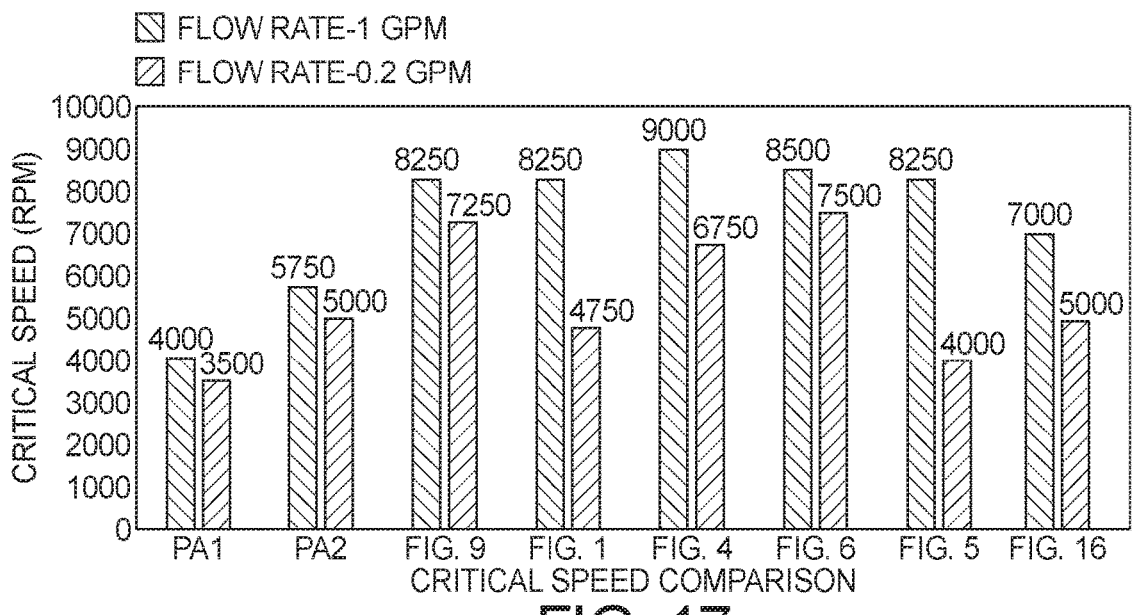
FIG. 17 is a graph providing a critical speed comparison for the various thrust washer designs of the present disclosure.
Figure 18:
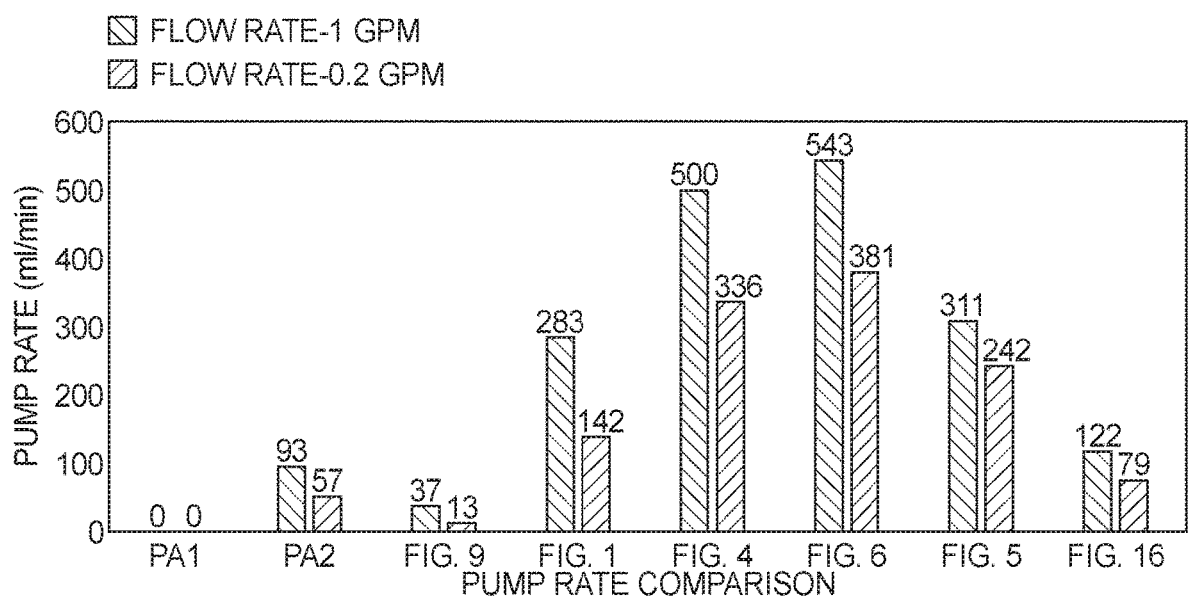
FIG. 18 is a graph providing a pump rate comparison for the various thrust washer designs of the present disclosure.
Figure 19:
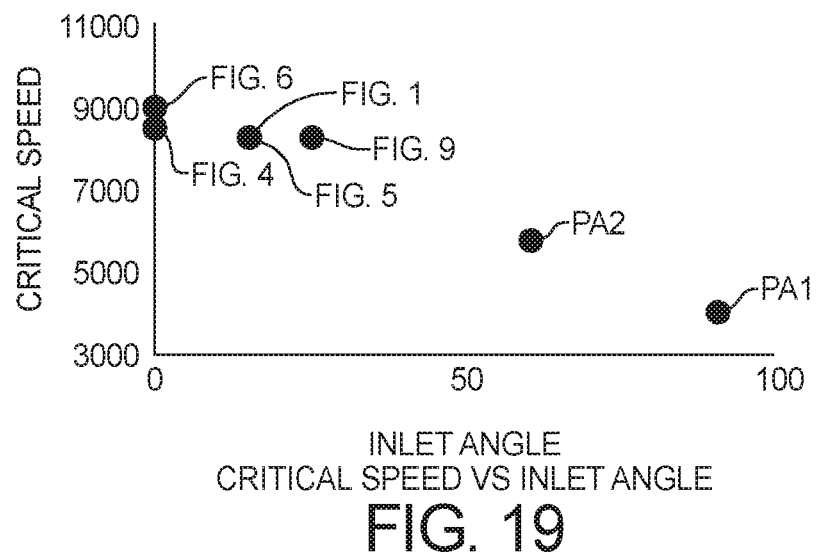
FIG. 19 is a graph of critical speed vs. inlet angle for the various thrust washer designs of the present disclosure.
Figure 20:
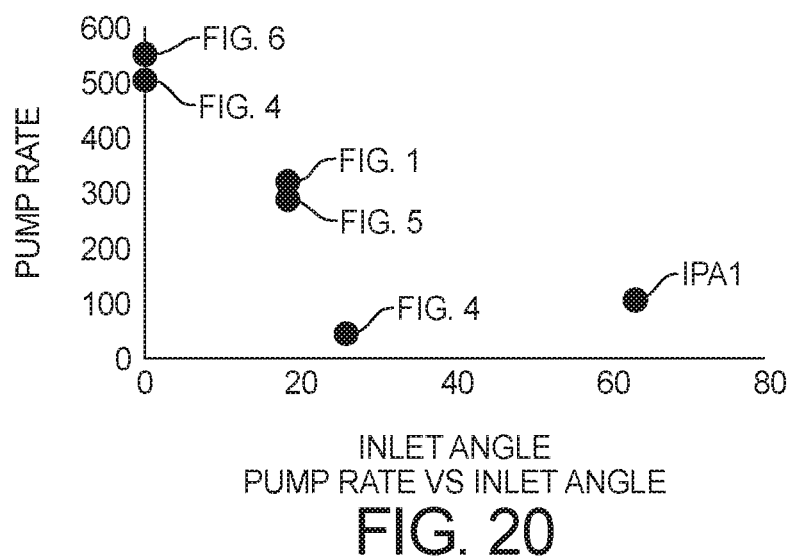
FIG. 20 is a graph of pump rate vs. inlet angle for the various thrust washer designs of the present disclosure.

With reference to FIG. 16, a washer 10 is shown according to an eighth embodiment in which the recessed hydrodynamic groove features 24 are combined with tapered grooves 40 which extend in a radial direction. The tapering grooves 40 get narrower in a radially outward direction. It should be understood that other shapes of tapering or straight grooves can be combined with the recessed hydrodynamic groove features 24.

Figure 21:
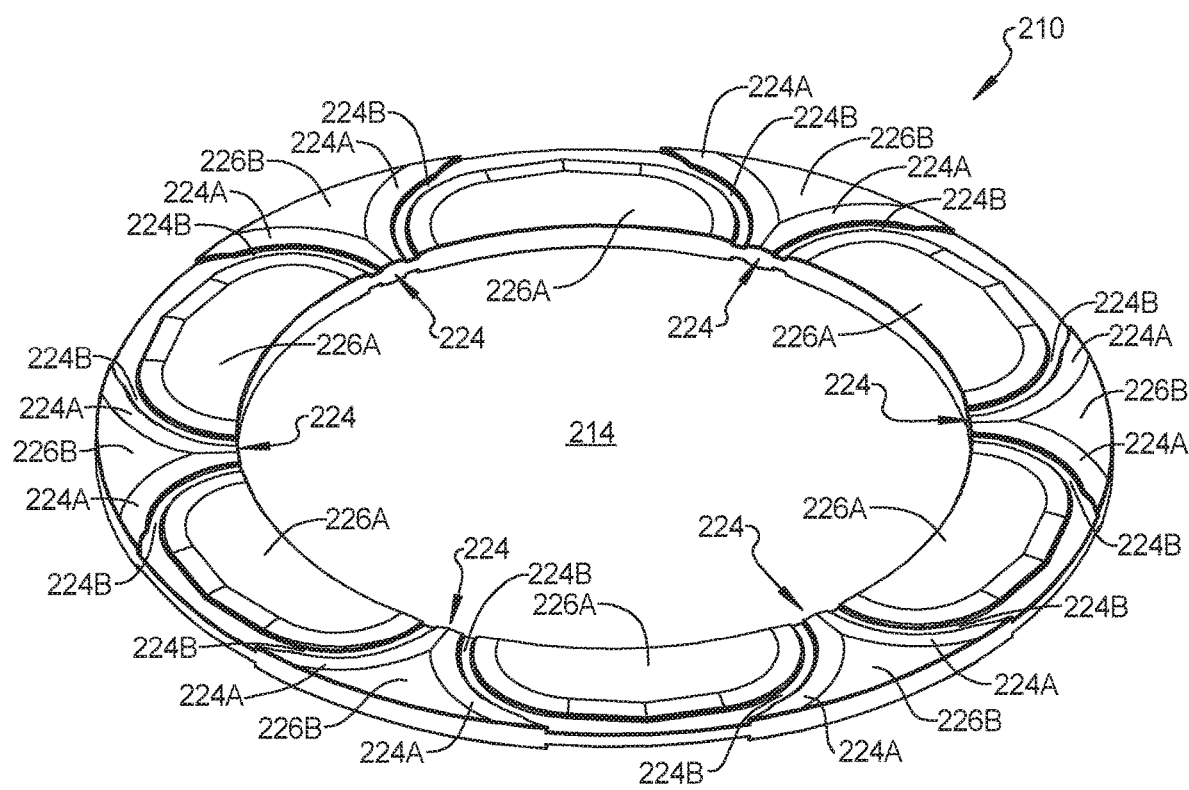
FIG. 21 is a perspective view of a thrust washer having symmetric bi-directional hydrodynamic grooves.
Figure 22:
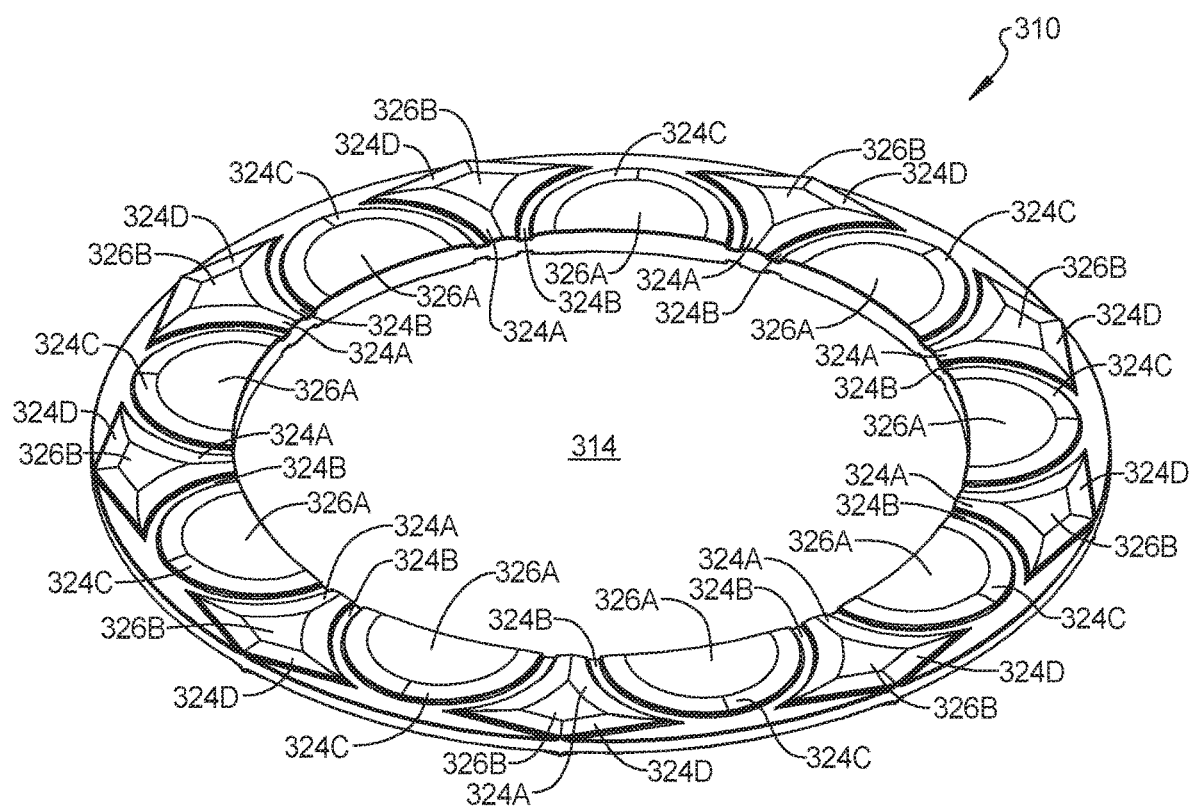
FIG. 22 is a perspective view of a thrust washer having symmetric bi-directional hydrodynamic grooves according to an alternative embodiment.

It should be noted that the above mentioned groove features 24 can be employed on one or both faces of the thrust washer 10, as shown in FIGS. 21 and 22. The groove features 24 on both faces of the thrust washer 10 can be aligned, as shown, or circumferentially offset. The groove features 24 on both faces of the thrust washer 10 can be offset and mirrored. The groove features 24 on both faces of the thrust washer 10 where the grooves 24 overlap but are mirrored so that the grooves on opposite faces cross over when viewed from the top.

With reference to FIG. 21, a thrust washer 210 is shown according to a further embodiment including bi-directional symmetric grooves 224. The thrust washer 210 includes an annular body 212 with an aperture 214 therein. The annular body 212 has a first axial face 216 and a second axial face 218 along with an outer diameter sidewall 220 and in inner diameter sidewall 222 extending between the first and second axial faces 216, 218. At least one of the axial faces 216, 218 includes a plurality of symmetric recessed hydrodynamic groove features 224 extending from the inner diameter sidewall 222 to the outer diameter sidewall 220, as shown in the axial face 216. The axial face 216 includes a plurality of planar lands 226A, 226B disposed between the recessed hydrodynamic groove features 224. The lands 226A are on an interior side of the hydrodynamic groove features 224 and the lands 226B are on an exterior side of the hydrodynamic groove features 224. The recessed hydrodynamic groove features 224 include a first transition groove region 224A that transitions from the planar lands 226B and a scoop region 224B stepped down relative to the transition groove region 224A and the planar lands 226A. The transition groove region 224A of the recessed hydrodynamic groove features 224 include an inlet angle α defined by an angle of a tangent of the radial profile R relative to a tangent of the circular outer sidewall 220. Additional transition groove regions 224C can be provided on interior side of the scoop regions 224B. The bi-directional symmetric grooves 224 allow for relative rotation in both directions without compromising lubrication to the land surfaces 226.

With reference to FIG. 22, a thrust washer 310 is shown according to a further embodiment including bi-directional symmetric grooves 324. The thrust washer 310 includes an annular body 312 with an aperture 314 therein. The annular body 312 has a first axial face 316 and a second axial face 318 along with an outer diameter sidewall 320 and in inner diameter sidewall 322 extending between the first and second axial faces 316, 318. At least one of the axial faces 316, 318 (and optionally both) includes a plurality of symmetric recessed hydrodynamic groove features 324 extending from the inner diameter sidewall 322 to the outer diameter sidewall 320, as shown in the axial face 316. The axial face 316 includes a plurality of planar lands 326A, 326B disposed between the recessed hydrodynamic groove features 324. The lands 326A are on an interior side of the hydrodynamic groove features 324 and the lands 326B are on an exterior side of the hydrodynamic groove features 324. The recessed hydrodynamic groove features 324 include a first transition groove region 324A that transitions from the planar lands 326B and a scoop region 324B stepped down relative to the transition groove region 324A and the planar lands 326A. The transition groove region 324A of the recessed hydrodynamic groove features 324 include an inlet angle α defined by an angle of a tangent of the radial profile R relative to a tangent of the circular outer sidewall 320. Additional transition groove regions 324C can be provided on interior side of the scoop regions 324B. In addition, as a variation from the embodiment of FIG. 21, the inlet end of the scoop region is recessed inward from the outer diameter sidewall 320 so that an additional transition groove region 324D can be disposed on a radially outer side of the exterior lands 226B. The bi-directional symmetric grooves 324 allow for relative rotation in both directions without compromising lubrication to the land surfaces 326.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thrust washer, comprising:
an annular body with an aperture therein and having a first axial face and a second axial face, an outer sidewall and an inner sidewall extending between the first and second axial faces, wherein at least one of the first and second axial faces includes a plurality of curved recessed grooves extending at least partially between the inner sidewall and the outer sidewall and defining un-recessed lands there between with the plurality of curved recessed grooves defining a transition region transitioning to the lands and a scoop region separated from the transition region by a stepped wall portion extending between the scoop region and the transition region, wherein the plurality of curved recessed grooves have a radial profile that is one of circular, elliptical, hyperbolic or logarithmic wherein the transition region is on an outer portion of the radial profile and the scoop region is on an inner portion of the radial profile, wherein the scoop region has an entry end opening into the outer sidewall.

2. The thrust washer according to claim 1, wherein the stepped wall portion defines a tip end along the outer sidewall.

3. The thrust washer according to claim 2, wherein the tip end has a tip radius $R_t$ between 0.001 to 0.1 inches.

4. The thrust washer according to claim 1, wherein the plurality of recessed grooves include at least four grooves.

5. The thrust washer according to claim 2, further comprising a plurality of straight recessed grooves disposed in the at least one axial face.

6. The thrust washer according to claim 2, wherein the plurality of recessed grooves are disposed on the first and second axial faces of the annular body.

7. A thrust washer, comprising:
an annular body with an aperture therein and having a first axial face and a second axial face, an outer sidewall and an inner sidewall extending between the first and second axial faces, wherein at least one of the first and second axial faces includes a plurality of recessed grooves extending at least partially between the inner sidewall and the outer sidewall and defining un-recessed lands there between with the plurality of recessed grooves defining a transition region transitioning to the lands and a scoop region separated from the transition region by a stepped wall portion extending between the scoop region and the transition region, wherein the plurality of recessed grooves have a chevron shape and wherein the transition region is on an outer portion of the chevron shape and the scoop region is on an inner portion of the chevron shape.

8. A thrust washer, comprising:
an annular body with an aperture therein and having a first axial face and a second axial face, an outer sidewall and an inner sidewall extending between the first and second axial faces, wherein at least one of the first and second axial faces includes a plurality of recessed grooves extending at least partially between the inner sidewall and the outer sidewall and defining un-recessed lands there between with the plurality of recessed grooves defining a transition region transitioning to the lands and a scoop region separated from the transition region by a stepped wall portion extending between the scoop region and the transition region, wherein the plurality of recessed grooves have a radial profile that is one of circular, elliptical, hyperbolic or logarithmic wherein the transition region is on an outer portion of the radial profile and the scoop region is on an inner portion of the radial profile, wherein the scoop region has an entry end opening into the outer sidewall, wherein the stepped wall portion defines a tip end along the outer sidewall, wherein the plurality of recessed grooves have a radial profile with an inlet angle relative to a tangent of the outer sidewall between 0° and 85°.

9. A thrust washer, comprising:
an annular body with an aperture therein and having a first axial face and a second axial face, an outer sidewall and an inner sidewall extending between the first and second axial faces, wherein at least one of the first and second axial faces includes a plurality of recessed grooves extending at least partially between the inner sidewall and the outer sidewall and defining un-recessed lands there between with the plurality of recessed grooves defining a transition region transitioning to the lands and a scoop region separated from the transition region by a stepped wall portion extending between the scoop region and the transition region, wherein the plurality of recessed grooves have a radial profile that is one of circular, elliptical, hyperbolic or logarithmic wherein the transition region is on an outer portion of the radial profile and the scoop region is on an inner portion of the radial profile, wherein the scoop region has an entry end opening into the outer sidewall, wherein the stepped wall portion defines a tip end along the outer sidewall, wherein the tip end has a tip radius $R_t$ between 0.001 to 0.1 inches, wherein the stepped wall portion has a scoop lead-in radius $R_{Li}$ extending from the tip end of between 0.005 and 0.75 inches.

10. The thrust washer according to claim 9, wherein the stepped wall portion has a scoop blend radius $R_b$ extending from the scoop lead-in radius of between 0.005 and 1.0 inches.

11. A thrust washer, comprising:
an annular body with an aperture therein and having a first axial face and a second axial face, an outer sidewall and an inner sidewall extending between the first and second axial faces, wherein at least one of the first and second axial faces includes a plurality of recessed symmetric bi-directional grooves extending at least partially between the inner sidewall and the outer sidewall and defining un-recessed lands there between with the plurality of recessed symmetric bi-directional grooves defining a transition region transitioning to the lands and a scoop region separated from the transition region by a stepped wall portion extending between the scoop region and the transition region, wherein the plurality of recessed symmetric bi-directional grooves have a radial profile that is one of circular, elliptical, hyperbolic or logarithmic wherein the transition region is on an outer portion of the radial profile and the scoop region is on an inner portion of the radial profile, wherein the scoop region has an entry end opening into the outer sidewall.

12. The thrust washer according to claim 11, wherein the stepped wall portion defines a tip end along the outer sidewall.

13. The thrust washer according to claim 12, wherein the plurality of recessed symmetric bi-directional grooves have a radial profile with an inlet angle relative to a tangent of the outer sidewall between 0° and 85°.

14. The thrust washer according to claim 12, wherein the tip end has a tip radius $R_t$ between 0.001 to 0.1 inches.

15. The thrust washer according to claim 14, wherein the stepped wall portion has a scoop lead-in radius $R_{Li}$ extending from the tip end of between 0.005 and 0.75 inches.

16. The thrust washer according to claim 15, wherein the stepped wall portion has a scoop blend radius $R_b$ extending from the scoop lead-in radius of between 0.005 and 1.0 inches.

17. The thrust washer according to claim 11, wherein the scoop region has an entry end spaced radially inward from the outer sidewalls.

18. The thrust washer according to claim 17, wherein the stepped wall portion defines a tip end spaced radially inward from the outer sidewall.

19. The thrust washer according to claim 11, wherein the plurality of recessed symmetric-bi-directional grooves are disposed on the first and second axial faces of the annular body.

\* \* \* \* \*